(12) United States Patent
Bhatnagar et al.

(10) Patent No.: US 10,605,573 B2
(45) Date of Patent: Mar. 31, 2020

(54) HIGH BUOYANCY COMPOSITE MATERIALS

(71) Applicant: HONEYWELL INTERNATIONAL INC., Morris Plains, NJ (US)

(72) Inventors: Ashok Bhatnagar, Richmond, VA (US); Tyler Bartelt, Chesterfield, VA (US); Henry Gerard Ardiff, Chesterfield, VA (US); Gary Kratzer, Midlothian, VA (US); David A. Hurst, Richmond, VA (US); Lori L. Wagner, Richmond, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 62 days.

(21) Appl. No.: 15/479,089

(22) Filed: Apr. 4, 2017

(65) Prior Publication Data

US 2017/0299339 A1 Oct. 19, 2017

Related U.S. Application Data

(60) Provisional application No. 62/322,834, filed on Apr. 15, 2016.

(51) Int. Cl.
*F41H 1/02* (2006.01)
*F41H 5/04* (2006.01)
(Continued)

(52) U.S. Cl.
CPC ............... *F41H 1/02* (2013.01); *B29B 15/12* (2013.01); *B29C 70/506* (2013.01); *B32B 3/26* (2013.01);
(Continued)

(58) Field of Classification Search
CPC ........... B29B 15/12; B32B 3/26; B32B 5/022; B32B 5/12; B32B 5/142; B32B 5/26;
(Continued)

(56) References Cited

U.S. PATENT DOCUMENTS

| 2,374,372 A | 4/1945 | Moss |
| 3,908,057 A | 9/1975 | Smith, II |

(Continued)

FOREIGN PATENT DOCUMENTS

| CN | 100556673 | 1/2006 |
| CN | 102516570 | 6/2012 |

(Continued)

OTHER PUBLICATIONS

Rohatgi, P.K., "Future Directions in Solidification of Metal Matrix Composites," Key Engineering Materials, vol. 104-107, Part 1, Trans Tech Publications, USA, pp. 293-312 (1995).

(Continued)

*Primary Examiner* — Vincent Tatesure
(74) *Attorney, Agent, or Firm* — Roberts & Roberts, LLP; Richard S. Roberts, Jr.

(57) ABSTRACT

Ballistic resistant composite materials having high positive buoyancy in water are provided. More particularly, provided are foam-free, buoyant composite materials fabricated using dry processing techniques. The materials comprise fibrous plies that are partially coated with a particulate binder that is thermopressed to transform a portion of the binder into raised, discontinuous patches bonded to fiber/tape surfaces, while another portion of the particulate binder remains on the fibers/tapes as unmelted particles. The presence of the unmelted binder particles maintains empty spaces within the composite materials which increases the positive buoyancy of the composites in water.

19 Claims, 6 Drawing Sheets

(51) Int. Cl.
*B32B 7/12* (2006.01)
*B32B 5/14* (2006.01)
*B32B 3/26* (2006.01)
*B32B 5/26* (2006.01)
*B29B 15/12* (2006.01)
*B29C 70/50* (2006.01)
*B32B 5/02* (2006.01)
*B32B 5/12* (2006.01)
*B32B 27/08* (2006.01)
*B29L 31/00* (2006.01)

(52) U.S. Cl.
CPC .............. *B32B 5/022* (2013.01); *B32B 5/12* (2013.01); *B32B 5/142* (2013.01); *B32B 5/26* (2013.01); *B32B 7/12* (2013.01); *B32B 27/08* (2013.01); *F41H 5/0478* (2013.01); *F41H 5/0485* (2013.01); *B29L 2031/768* (2013.01); *B32B 2250/20* (2013.01); *B32B 2255/02* (2013.01); *B32B 2255/26* (2013.01); *B32B 2262/0223* (2013.01); *B32B 2262/0253* (2013.01); *B32B 2262/0269* (2013.01); *B32B 2262/0276* (2013.01); *B32B 2262/0284* (2013.01); *B32B 2262/101* (2013.01); *B32B 2307/514* (2013.01); *B32B 2307/54* (2013.01); *B32B 2307/718* (2013.01); *B32B 2571/02* (2013.01)

(58) Field of Classification Search
CPC ......... B32B 27/08; B32B 7/12; B29C 70/506; F41H 5/0478; F41H 5/0485
USPC ........................................................ 442/135
See application file for complete search history.

(56) References Cited

U.S. PATENT DOCUMENTS

| | | | |
|---|---|---|---|
| 4,457,985 A | 7/1984 | Harpell et al. | |
| 4,495,661 A | 1/1985 | Kamat | |
| 4,563,392 A | 1/1986 | Harpell et al. | |
| 4,614,678 A | 9/1986 | Ganga | |
| 4,623,574 A | 11/1986 | Harpell et al. | |
| 5,190,809 A | 3/1993 | Marissen et al. | |
| 5,242,651 A | 9/1993 | Brayden et al. | |
| 5,433,998 A | 7/1995 | Curzio et al. | |
| 5,587,034 A | 12/1996 | Ma | |
| 5,587,230 A | 12/1996 | Lin et al. | |
| 5,756,206 A | 5/1998 | Davies et al. | |
| 5,789,327 A | 8/1998 | Rousseau | |
| 6,127,291 A | 10/2000 | Coppage, Jr. et al. | |
| 6,127,457 A | 10/2000 | Darling | |
| 6,231,921 B1 | 5/2001 | Hashemzadeh et al. | |
| 6,265,333 B1 | 7/2001 | Dzenis et al. | |
| 6,387,179 B1 | 5/2002 | Anderson et al. | |
| 6,562,435 B1 | 5/2003 | Brillhart, III et al. | |
| 6,846,548 B2 | 1/2005 | Harpell et al. | |
| 6,846,758 B2 | 1/2005 | Bhatnagar et al. | |
| 7,094,449 B2 | 8/2006 | Boler, Jr. | |
| 7,308,862 B2 | 12/2007 | Romanski et al. | |
| 7,763,555 B2 | 7/2010 | Nguyen et al. | |
| 7,964,518 B1 | 6/2011 | Bhatnagar et al. | |
| 8,048,815 B2 | 11/2011 | Kubota et al. | |
| 8,075,988 B2 | 12/2011 | Arai et al. | |
| 8,343,414 B2 | 1/2013 | Miller et al. | |
| 8,455,081 B2 | 6/2013 | Jacobs | |
| 8,652,371 B2 | 2/2014 | Smith et al. | |
| 8,652,570 B2 | 2/2014 | Arvidson et al. | |
| 8,883,657 B2 | 11/2014 | Hassan et al. | |
| 8,883,661 B2 | 11/2014 | Montagna et al. | |
| 8,986,810 B2 | 3/2015 | Grunden et al. | |
| 9,023,452 B2 | 5/2015 | Tam et al. | |
| 9,156,728 B2 | 10/2015 | Peters et al. | |
| 2001/0001408 A1 | 5/2001 | Belvin et al. | |
| 2001/0021443 A1 | 9/2001 | Bornemann et al. | |
| 2005/0255766 A1 | 11/2005 | Kruger et al. | |
| 2006/0057359 A1 | 3/2006 | Travelute et al. | |
| 2007/0269644 A1 | 11/2007 | Harper et al. | |
| 2008/0075933 A1* | 3/2008 | Rovers ............... | F41H 5/0485 428/196 |
| 2011/0113534 A1 | 5/2011 | Sauer et al. | |
| 2011/0230112 A1 | 9/2011 | Rose et al. | |
| 2011/0269359 A1 | 11/2011 | Tam et al. | |
| 2012/0024139 A1 | 2/2012 | Stewart et al. | |
| 2012/0244769 A1 | 9/2012 | Ardiff et al. | |
| 2013/0059112 A1 | 3/2013 | Tam et al. | |
| 2013/0101762 A1 | 4/2013 | Malis et al. | |
| 2013/0213208 A1 | 8/2013 | Compton et al. | |
| 2013/0243989 A1 | 9/2013 | Ridges et al. | |
| 2014/0065913 A1 | 3/2014 | Klein et al. | |
| 2014/0087125 A1 | 3/2014 | Ardiff et al. | |
| 2014/0148543 A1 | 5/2014 | Roberts, III et al. | |
| 2014/0288212 A1 | 9/2014 | Nagata et al. | |
| 2014/0364025 A1 | 12/2014 | Zhang et al. | |
| 2015/0040749 A1 | 2/2015 | Bhatnagar et al. | |
| 2015/0343738 A1 | 12/2015 | Strauss | |

FOREIGN PATENT DOCUMENTS

| | | |
|---|---|---|
| CN | 103753904 | 4/2014 |
| CN | 104494170 | 4/2015 |
| CN | 104626603 | 5/2015 |
| EP | 936056 | 8/1999 |
| EP | 1419875 | 5/2004 |
| JP | 3-15535 | 1/1991 |
| JP | 6206262 | 7/1994 |
| JP | H08118350 | 5/1996 |
| JP | 2004043653 | 2/2004 |
| JP | 2004143226 | 5/2004 |
| JP | 4314845 | 9/2004 |
| JP | 2004323755 | 11/2004 |
| JP | 2007307900 | 11/2007 |
| KR | 1155765 | 6/2011 |
| KR | 1020130095411 | 8/2013 |
| WO | 89006796 | 7/1989 |
| WO | 9906785 | 2/1999 |
| WO | 2013107829 | 7/2013 |

OTHER PUBLICATIONS

Shimp et al., "Controlling Moisture Effects During the Curing of High Tg Cyanate Ester/Aramid Composites," International SAMPE Symposium and Exhibition (Proceedings), vol. 38, No. 1, SAMPE Publishing, USA, pp. 370-379 (1993).

Vasat et al., "Effect of Moisture Uptake on the Polymerization and Devolatilization of AFR700 Polyimide Composites," International SAMPE Technical Conference, vol. 27, SAMPE Publishing, USA, pp. 843-853 (1995).

International Search Report and Written Opinion for International Application No. PCT/US2017/026281.

\* cited by examiner

HIGH BUOYANCY COMPOSITE MATERIALS

CROSS-REFERENCE TO RELATED APPLICATION

This application claims the benefit of U.S. Provisional Application Ser. No. 62/322,834 filed on Apr. 15, 2016, the disclosure of which is incorporated by reference herein in its entirety.

BACKGROUND

Technical Field

The disclosure relates to ballistic resistant composite materials having superior positive buoyancy in water. More particularly, the disclosure pertains to foam-free, buoyant composite materials fabricated using dry processing techniques.

Description of the Related Art

Soft body armor articles are typically fabricated in the form of textile garments that contain compartments or pockets into which panels of ballistic resistant materials are positioned. For example, U.S. Pat. No. 5,398,340 teaches a bullet resistant vest fabricated as a shell having embedded anti-ballistic panels, wherein the shell is designed to keep the panels in a proper protective position when the vest is worn by a moving officer. U.S. Pat. Nos. 7,636,948 and 9,222,757 each teach plate carrier designs including front and rear panel sections with unique arrangements of pockets for supporting unique arrangements of ballistic plates and inserts. Most typically, such vests are designed so that the embedded plates are permanently sewn into the vest shell, rather than the plates simply being inserted into open pockets permitting them to be removed.

Although this type of body armor is effective for protecting a user from projectile impact related injuries, it can have various disadvantages. First, the plates and other inserts are typically quite heavy and burdensome for the user to carry. Second, the plates are often quite large and restrictive of user mobility. Third, the plates typically have either neutral or negative buoyancy, which can affect the buoyancy of the complete armor article, and in many instances positive buoyancy is desired.

Each of the first and second disadvantages identified above may be overcome by reducing the size of the armor plates, either by making the plates thinner and/or smaller. However, shrinking the size of the plates sacrifices the degree of protective coverage and thereby limits the usefulness of the armor.

With regard to the issue of buoyancy, one conventionally known approach for making soft body armor more buoyant is by adding buoyant inserts into the vest design. See, for example, U.S. Pat. No. 6,892,392 which teaches personal body armor having hard armor plates on the front and back regions of the vest and buoyant foam pads affixed to the interior of the vest sections. U.S. Pat. No. 7,210,390 teaches a personal ballistic protective device having a first layer comprised of ballistic material and a second layer comprised of buoyant material such as a closed-cell foam. U.S. Pat. No. 7,080,411 teaches an armor garment incorporating an inflatable flotation bladder inside the garment. However, incorporating buoyant inserts adds substantial bulk to the armor article, which reduces user comfort. Also, the above solutions are only designed to address the problem of garment buoyancy and do not address the aforementioned weight and mobility concerns.

As an alternative strategy for overcoming the physical problems associated with heavy, bulky, non-buoyant armor, armor developers have designed solutions allowing vests to be quickly removed in emergency circumstances, such as if a user falls into water. See, for example, U.S. Pat. Nos. 8,201,271 and 8,499,362 which teach armor vests having quick release mechanisms allowing for the quick removal of the vest if circumstances demand its quick removal. U.S. Pat. No. 7,243,376 explains that soldiers have been known to drown due to the heavy weight of body armor vests and teaches a cut away vest structure that may be quickly and easily removed by a wearer. However, these solutions only have limited usefulness and are not solutions for overcoming the disadvantages of an armor system while in actual use.

Accordingly, there remains a need in the art for an optimized soft body armor construction that is light, flexible and buoyant. The present disclosure provides a solution to this need.

SUMMARY

The disclosure provides soft body armor articles that are fabricated from ballistic resistant materials having improved positive buoyancy relative to the materials of the related art. The materials are formed using dry processing techniques wherein extremely thin fibrous plies, formed from fibers and/or tapes (preferably multi-filament tapes), are partially coated with a dry particulate binder, e.g. a powder binder, rather than a being coated with a liquid or molten binder. The particulate binder is only partially melted during processing, whereby the fibers/tapes are only partially covered by discontinuous patches of melted and/or softened binder as well as unmelted polymer particles. The resulting material has binder-free areas where portions of adjacent fibers/tapes are not touching each other and wherein empty spaces are present in said areas. The empty spaces thereby enhance the buoyancy of the material. When the material is used for the fabrication of soft armor plate carrier shells, it counterbalances the weight of any incorporated plates having negative buoyancy and eliminates or minimizes the need for bulky floatation components, such as foams. Additionally, the material provides enhanced anti-ballistic protection in areas where plates are not incorporated, allowing the size of the plates to be reduced without risking loss of life.

As such, the disclosure provides a ballistic resistant material comprising at least one fibrous ply, each fibrous ply comprising a plurality of fibers and/or a plurality of tapes, wherein one or more of said fibers/tapes have surfaces that are partially covered by raised, discontinuous patches of a polymeric binder bonded to and extending from the fiber/tape surfaces, and wherein the material further comprises a plurality of polymer particles on and/or between said fibers/tapes.

Also provided is a ballistic resistant material comprising:

a) a plurality of non-woven plies, each ply comprising a plurality of adjacent, unidirectional fibers and/or a plurality of adjacent, unidirectional tapes, wherein one or more of said fibers/tapes have surfaces that are partially covered by discontinuous patches of a polymeric binder bonded to the fiber/tape surfaces; each ply having an outer top surface and an outer bottom surface; and b) at least one thermoplastic overlay bonded to at least one surface of at least one of said plies, wherein said at least one thermoplastic overlay only partially covers said at least one surface, and wherein said at least one thermoplastic overlay has a melting point below a melting point of said polymeric binder.

Further provided is a method for forming a ballistic resistant material comprising:

a) providing a first non-woven fibrous ply comprising an array of adjacent, unidirectionally oriented fibers or an array of adjacent, unidirectionally oriented tapes, said first non-woven fibrous ply having an outer top surface and an outer bottom surface b) applying a dry, solvent-free particulate polymeric binder to at least one surface of said first non-woven fibrous ply;

c) applying at least one thermoplastic overlay onto a surface of said first non-woven fibrous ply, wherein said at least one thermoplastic overlay only partially covers said surface, and wherein said at least one thermoplastic overlay has a melting point below a melting point of said polymeric binder; wherein steps b) and c) are reversible;

d) heating the at least one thermoplastic overlay to at least its softening temperature, and allowing it to bond to said surface of the first non-woven fibrous ply;

e) applying a second non-woven fibrous ply onto the first non-woven fibrous ply on said at least one thermoplastic overlay, said second non-woven fibrous ply comprising an array of adjacent, unidirectionally oriented fibers or an array of adjacent, unidirectionally oriented tapes, said second non-woven fibrous ply having first and second surfaces and said second non-woven fibrous ply comprising a dry, solvent-free particulate polymeric binder on at least one of said surfaces; and f) consolidating said first non-woven fibrous ply and said second non-woven fibrous ply under heat and pressure wherein at least a portion of the particulate polymeric binder of the first non-woven fibrous ply and at least a portion of the particulate polymeric binder of the second non-woven fibrous ply are melted, and whereby said binders bond the first and second non-woven fibrous plies together.

DETAILED DESCRIPTION

Figure 1:
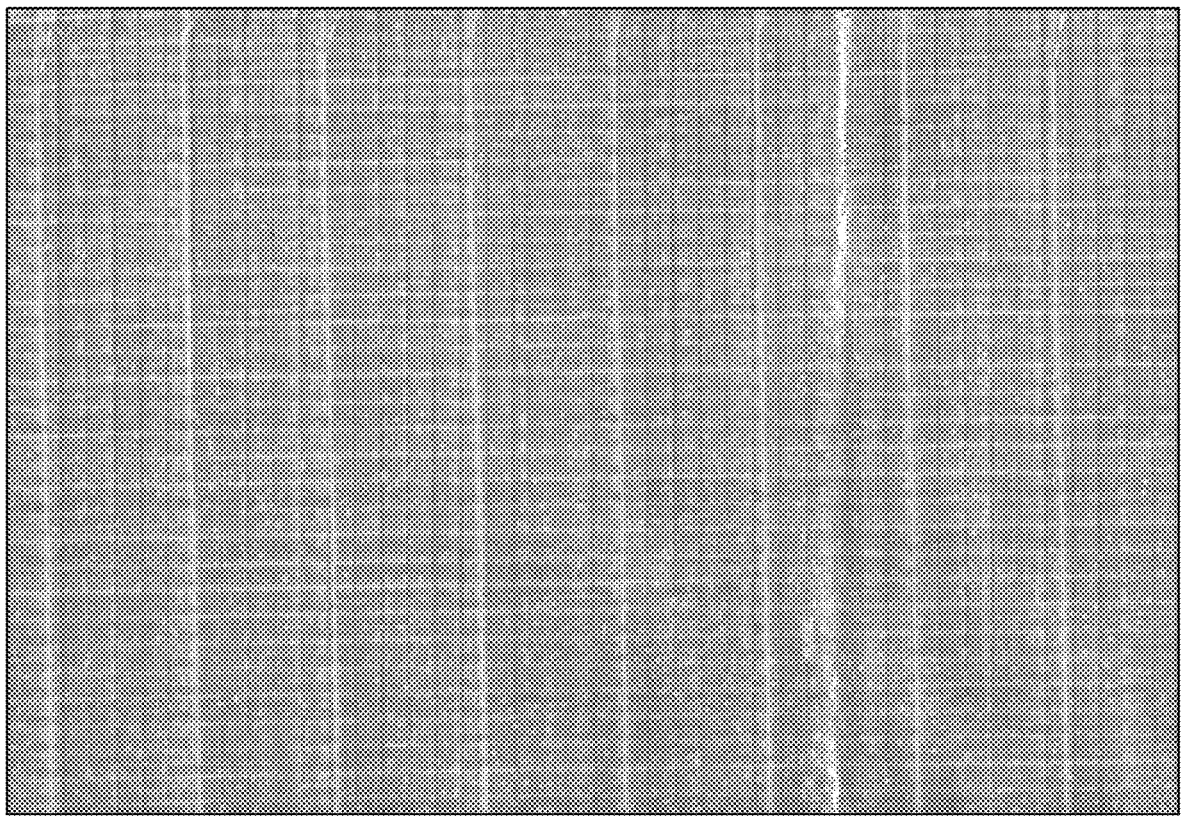
FIG. 1 is a top-view scanned image of a 2-ply non-woven fabric coated with a powder resin.

The composite materials provided herein are particularly intended for the fabrication of ballistic resistant body armor, and therefore it is particularly intended that the composite materials are to be fabricated using high tensile strength fibers and/or high tensile strength tapes that are formed from high tensile strength fibers. However, the dry binder processing technique is equally applicable to the fabrication of buoyant non-armor articles, and therefore this disclosure should not be interpreted as being limited to armor applications only nor to fibrous composites comprising high tenacity fibers only.

As used herein, a "fiber" is a long strand of a material, such as a strand of a polymeric material, the length dimension of which is much greater than the transverse dimensions of width and thickness. The fiber is preferably a long, continuous (but of a definite length) strand, rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section.

A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

The term "denier" is a unit of linear density equal to the mass in grams per 9000 meters of fiber/yarn. In this regard, the fibers forming each layer may be of any suitable denier.

For example, fibers may have a denier of from about 50 to about 5000 denier, more preferably from about 200 to about 5000 denier, still more preferably from about 200 to about 3000 denier, still more preferably from about 200 to about 1000 denier, and most preferably from about 200 to about 500 denier.

A "fibrous layer" as used herein may comprise any type of uni-axial or multi-axial fabric, including a single-ply of unidirectionally oriented or randomly oriented (i.e. felted) non-woven fibers, a plurality of plies of non-woven fibers/tapes that have been consolidated into a single unitary structure, a single-ply of woven fabric, a plurality of woven fabric plies that have been consolidated into a single unitary structure, a single-ply of knitted fabric or a plurality of knitted fabric plies that have been consolidated into a single unitary structure. In this regard, a "layer" describes a generally planar arrangement having an outer top (first) planar surface and an outer bottom (second) planar surface. The term "fibrous ply" as used herein refers to a single array of unidirectionally oriented fibers/tapes, a single woven fabric, a single knitted fabric or a single felted fabric. Each fibrous ply will also have both an outer top surface and an outer bottom surface and a plurality of "fibrous plies" describes more than one ply of the fibrous structures. A "single-ply" of unidirectionally oriented fibers/tapes comprises an arrangement of fibers/tapes that are aligned in a unidirectional, substantially parallel array. This type of arrangement is also known in the art as a "unitape", "unidirectional tape", "UD" or "UDT." As used herein, an "array" describes an orderly arrangement of fibers, yarns or tapes, which is exclusive of woven and knitted fabrics, and a "parallel array" describes an orderly, side-by-side, coplanar parallel arrangement of fibers, yarns or tapes. The term "oriented" as used in the context of "oriented fibers/tapes" refers to the alignment direction of the fibers/tapes rather than to stretching of the fibers/tapes. The term "fabric" describes structures that may include one or more fibrous plies, with or without consolidation/molding of the plies. A non-woven fabric formed from unidirectional fibers/tapes typically comprises a plurality of non-woven fibrous plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation or molding techniques. The term "composite" in the context of this disclosure refers to combinations of fibers/yarns/tapes with a polymeric binder material, and the term "fibrous" denotes materials made with fibers/yarns as well as tapes.

As used herein, a "high tensile strength" fiber is one which has a tenacity of at least 10 g/denier, an initial tensile modulus of at least about 150 g/denier or more, and an energy-to-break of at least about 8 J/g or more, each as measured by ASTM D2256. The high tensile strength fibers preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier.

Particularly suitable high tenacity fibers include polyolefin fibers, such as high molecular weight polyethylene fibers, particularly ultra-high molecular weight polyethylene fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred fiber types for the second fibrous material and optional third fibrous material are high performance fibers including polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are polyethylene fibers and aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. No. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc. SPECTRA® fibers are well known in the art.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" processes, also referred to as "solution spinning," wherein a solution of ultra high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV—OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl(2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

As used herein, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. Known tapes may be fibrous or non-fibrous, wherein a "fibrous" tape comprises one or more filaments. The cross-section of a tape of this disclosure may be rectangular, oval, polygonal, irregular, or of any shape satisfying the width, thickness and aspect ratio requirements outlined herein.

Such tapes preferably have a substantially rectangular cross-section with a thickness of about 0.5 mm or less, more preferably about 0.25 mm or less, still more preferably about 0.1 mm or less and still more preferably about 0.05 mm or less. In the most preferred embodiments, the polymeric tapes have a thickness of up to about 3 mils (76.2 μm), more preferably from about 0.35 mil (8.89 μm) to about 3 mils (76.2 μm), and most preferably from about 0.35 mil to about 1.5 mils (38.1 μm). Thickness is measured at the thickest region of the cross-section.

Tapes useful herein have preferred widths of from about 2.5 mm to about 50 mm, more preferably from about 5 mm to about 25.4 mm, even more preferably from about 5 mm to about 20 mm, and most preferably from about 5 mm to about 10 mm. These dimensions may vary but the tapes used herein are most preferably fabricated to have dimensions that achieve an average cross-sectional aspect ratio, i.e. the ratio of the greatest to the smallest dimension of cross-sections averaged over the length of the tape article, of greater than about 3:1, more preferably at least about 5:1, still more preferably at least about 10:1, still more preferably at least about 20:1, still more preferably at least about 50:1, still more preferably at least about 100:1, still more preferably at least about 250:1 and most preferred tapes have an average cross-sectional aspect ratio of at least about 400:1.

Tapes are formed by conventionally known methods. For example, a fabric may be cut or slit into tapes having a desired length. An example of a slitting apparatus is disclosed in U.S. Pat. No. 6,098,510 which teaches an apparatus for slitting a sheet material web as it is wound onto said roll. Another example of a slitting apparatus is disclosed in U.S. Pat. No. 6,148,871, which teaches an apparatus for slitting a sheet of a polymeric film into a plurality of film strips with a plurality of blades. The disclosures of both U.S. Pat. Nos. 6,098,510 and 6,148,871 are incorporated herein by reference to the extent consistent herewith. Such methods are particularly useful for forming non-fibrous polymeric tapes but the method of fabricating non-fibrous, polymeric tapes is not intended to be limiting.

Particularly useful methods for forming multi-filament fibrous tapes are described in commonly-owned U.S. Pat. Nos. 8,236,119; 8,697,220; 8,685,519; 8,852,714; 8,906,485, each of which is incorporated herein by reference to the extent consistent herewith. Each of these patents describes methods where a multifilament feed fiber/yarn is compressed and flattened to form a tape. Particularly, U.S. Pat. No. 8,236,119 teaches a process for the production of a polyethylene tape article comprising: (a) selecting at least one polyethylene multi-filament yarn, said yarn having a c-axis orientation function at least 0.96, an intrinsic viscosity when measured in decalin at 135° C. by ASTM D1601-99 of from about 7 dl/g to about 40 dl/g, and said yarn having a tenacity of from about 15 g/d to about 100 g/d as measured by ASTM D2256-02 at a 10 inch (25.4 cm) gauge length and at an extension rate of 100%/min; (b) placing said yarn under a longitudinal tensile force and subjecting said yarn to at least one transverse compression step to flatten, consolidate and compress said yarn at a temperature of from about 25° C. to about 137° C., thereby forming a tape article having an average cross-sectional aspect ratio at least about 10:1, each said compression step having an outset and a conclusion wherein the magnitude of said longitudinal tensile force on each said yarn or tape article at the outset of each said compression step is substantially equal to the magnitude of the longitudinal tensile force on the yarn or tape article at the conclusion of that same compression step, and is at least about 0.25 kilogram-force (2.45 Newtons); (c) stretching said tape article at least once at a temperature in the range of from about 130° C. to about 160° C. at a stretch rate of from about 0.001 $min^{-1}$ to about 1 $min^{-1}$; (d) optionally repeating step (b) one or more times at a temperature from about 100° C. to about 160° C.; (e) optionally repeating step (c) one or more times; (f) optionally relaxing the longitudinal tensile force between any of steps (b) to (e); (g) optionally increasing the longitudinal tensile force between any of steps b) to (e); and (h) cooling said tape article to a temperature less than about 70° C. under tension.

This process may also be modified by, prior to step (b), optionally continuously passing the yarn through one or more heated zones at temperatures of from about 100° C. to about 160° C. under tension, followed by stretching the heated yarn at least once at a stretch rate of from about 0.01 min$^{-1}$ to about 5 min$^{-1}$. The compressed and flattened multi-filament tapes formed according to the methods of these commonly-owned patents are particularly desirable herein.

Particularly suitable high-strength, high tensile modulus non-fibrous polymeric tape materials are polyolefin tapes. Preferred polyolefin tapes include polyethylene tapes, such as those commercially available under the trademark TENSYLON®, which is commercially available from E. I. du Pont de Nemours and Company of Wilmington, Del. See, for example, U.S. Pat. Nos. 5,091,133; 7,964,266; 7,964,267; and 7,976,930, all of which are incorporated herein by reference. Also suitable are polypropylene tapes, such as those commercially available under the trademark TEGRIS® from Milliken & Company of Spartanburg, S.C. See, for example, U.S. Pat. No. 7,300,691 which is incorporated herein by reference. Polyolefin tape-based composites that are useful as spall resistant substrates herein are also commercially available, for example under the trademark DYNEEMA® BT10 from Royal DSM N.V. Corporation of Heerlen, The Netherlands and under the trademark ENDUMAX® from Teijin Aramid Gmbh of Germany. Also useful are the fibrous and non-fibrous tapes described in commonly-owned U.S. Pat. Nos. 8,986,810; 9,138,961 and 9,291,440, each of which is incorporated herein by reference to the extent consistent herewith. Non-fibrous, polymeric tapes useful herein will have the same preferred thicknesses and aspect ratios as the fiber-based tapes, but may be fabricated to have wider widths of from about 2.5 mm to about 21 cm, more preferably from about 2.5 mm to about 10 cm, still more preferably from about 2.5 mm to 5 cm, still more preferably from about 2.5 mm to about 25 mm, even more preferably from about 5 mm to about 20 mm, and most preferably from about 5 mm to about 10 mm.

Like fibers, multi-filament tapes may be fabricated from the exact same polymer types discussed above for fibers, because such tapes are formed by compressing and flattening such fibers. Accordingly, like fibers, the tapes may be of any suitable denier, preferably having a denier of from about 50 to about 30,000, more preferably from about 200 to about 10,000 denier, still more preferably from about 650 to about 2000 denier, and most preferably from about 800 to about 1500 denier. Additionally, useful tapes are preferably "high tensile strength" tapes having a tenacity of at least 10 g/denier, an initial tensile modulus of at least about 150 g/denier or more, and an energy-to-break of at least about 8 J/g or more, each as measured by ASTM D882-09 at 10 inch (25.4 cm) gauge length and at an extension rate of 100%/min. The high tensile strength tapes preferably have a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier, each as measured by ASTM D882-09 at 10 inch (25.4 cm) gauge length and at an extension rate of 100%/min.

The fibrous plies of this disclosure may individually comprise any type of uni-axial or multi-axial fabric, including woven fabrics, non-woven fabrics formed from unidirectionally oriented fibers/tapes, non-woven felted fabrics formed from randomly oriented fibers/tapes, or knitted fabrics. Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers/tapes are woven together in an orthogonal 0°/90° orientation with warp fibers/tapes oriented perpendicular to weft (fill) fibers/tapes, and is preferred. The warp and weft (fill) count, known in the art as a "pick count" or "mesh count," is a measure of the density of the woven fabric. Plain weave fabrics may have an equal or unequal warp and weft count. In this regard, preferred first fibrous materials have a preferred pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. Preferred second fibrous materials have a preferred pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions.

Knit fabric structures are typically formed from fibers rather than tapes and are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Felts are also formed from fibers rather than tapes and may be formed by one of several techniques known in the art, such as by carding or fluid laying, melt blowing and spin laying. A felt is a non-woven network of randomly oriented fibers, preferably at least one of which is a discontinuous fiber, preferably a staple fiber having a length ranging from about 0.25 inch (0.64 cm) to about 10 inches (25.4 cm).

A non-woven unidirectional fibrous ply of the disclosure may be formed by conventional methods in the art, but without impregnating the ply with a resin, as discussed below. For example, in a preferred method of forming a non-woven unidirectional fibrous ply, a plurality of fibers/tapes are arranged into an array, typically being arranged as a web comprising a plurality of fibers/tapes aligned in a substantially parallel, unidirectional array. In a typical process that utilizes multi-filament fibers, fiber bundles are supplied from a creel and led through guides and one or more spreader bars into a collimating comb. This is typically followed by coating the fibers with a particulate polymeric binder material. A typical fiber bundle (as well as a typical multi-filament tape) will have from about 30 to about 2000 individual filaments. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. When tapes are utilized rather than fiber bundles, the tapes are arranged in a side-by-side array, preferably edge-to-edge without adjacent tapes overlapping each other, directly from a creel without the need to spread filaments using spreader bars or a collimating comb.

Whether unidirectional non-woven, felted non-woven, woven or knitted, the ballistic effectiveness of the composite material is maximized by combining and merging a plurality of fibrous plies into a unitary composite. In this regard, a plurality of single plies of the selected fabric/fibrous ply type are stacked on top of each other in coextensive fashion and merged, i.e. consolidated, together. The number of plies in the unitary composite will vary depending on the desired end use and the desired ballistic resistance and weight requirements. In preferred embodiments, a multi-ply fibrous material preferably includes from 2 to about 100 fibrous plies, more preferably from 2 to about 85 fibrous plies, and most preferably from about 2 to about 65 fibrous plies. When the multi-ply composite comprises a plurality of unidirectional non-woven fibrous plies, it is typical for a plurality of such plies to first be formed into a 2-ply or 4-ply unidirectional non-woven fibrous "layer," also referred to in the art as a "pre-preg," prior to combining a plurality of such "layers" or "pre-pregs" together to form the section. Each fibrous "layer" or "pre-preg" typically includes from 2 to about 6 fibrous plies, typically being cross-plied at 0°/90°, but may include as many as about 10 to about 20 fibrous plies as may be desired for various applications, with alternating layers preferably being cross-plied at alternating 0°/90° orientations (although other angular orientations are also useful).

There are many means available for joining a plurality of fibrous plies together into a multi-ply structure, including mechanical means (e.g., stitches, staples, rivets, bolts, screws, etc.) and adhesive means (i.e., with a polymeric binder, often referred to in the art as a "polymeric matrix"), with adhesive attachment being the most common. When combining non-woven plies in particular, a polymeric binder is generally also needed to initially to merge the fibers/tapes together into individual ply form prior to forming pre-pregs and/or merging a plurality of plies together. Methods for applying a polymeric binder material to fibrous plies/layers are well known in the art. In a conventional method of the prior art, a binder is applied as a continuous coating, typically wherein fibers are fully coated or encapsulated by the binder, typically by coating fibers with a molten polymer or a polymer solution, thereby allowing the binder to flow around and between fibers, especially when the fabrics are thermopressed. Additionally, in the conventional methods of the prior art, fibrous plies are formed by "impregnating" the plies with the binder wherein the binder material diffuses into the fibrous ply and is not simply on a surface of the ply, i.e., such that the fibers are embedded in or encapsulated by the binder polymer. However, in the present disclosure, the fibers/tapes are not coated with a molten polymer or a polymer solution, but rather with a particulate binder material, and although the fibrous plies are attached to each other using adhesive means, the fibrous plies are not impregnated with, embedded in or encapsulated by the resin. Rather, they are surface coated only, and more specifically only partially surface coated, with dry polymer particles, some of which are softened and/or partially melted but which remain on the fiber/tape surfaces and remain localized without flowing from their original location of application, and some of which remain unsoftened and unmelted entirely. Particularly, dry polymer particles, e.g., in the form of a powder, are applied to the fiber/tape surfaces and, even after all desired processing steps are finished, a portion of the binder will remain in particulate form on and/or between some or all of the fibers/tapes.

Any useful method of applying the particulate binder may be employed, including particle/powder spraying, including conventional electrostatic spray methods such as corona powder spraying or tribo powder spraying with commercially available corona or tribo powder spraying equipment. Also useful is particle/powder sprinkling such as gravity sprinkling, which can be accomplished manually or can be automated, or any other well-known powder coating technique that will effectively coat the fibers/tapes with a dry particulate binder without using a liquid carrier. Suitable powder spraying equipment is commercially available, for example, from Mitsuba Systems of Mumbai, India, such as the Multistatic Series 700, Sprayright Series 700, Tribo Series and Icoat Series equipment from Mitsuba Systems, as well commercially available Automatic Powder Coating equipment from Mitsuba Systems. Also suitable are powder applicators commercially available from Nordson Corporation of Westlake, Ohio. One exemplary powder spraying apparatus useful herein is described in U.S. Pat. No. 5,678,770 to Mitsuba Systems, which is incorporated herein by reference to the extent consistent herewith. Other useful methods are described in U.S. pre-grant publication 2009/0169836, which is incorporated herein by reference to the extent consistent herewith. Also useful are methods of electrostatic fluidized (dry) bed coating and electrostatic magnetic brush coating, which are well known powder application techniques. The method of particle application is not intended to be strictly limiting except that the particles are applied dry and solvent free, and this specifically excludes the application of particulate resins in the form solutions, emulsions or dispersions. This dry binder application method is particularly desirable because it enables the resin to be applied to the fiber/tape surfaces without the need to support the fiber/tapes on a release paper/film, which is conventionally needed when coating unidirectional fiber arrays with a molten/liquid resin. In said conventional methods, such a release paper must be removed prior to further processing, which adds additional, undesirable complexity to the fabrication process.

In order to optimize the anti-ballistic properties of the fibrous materials of the disclosure, it is preferred that the binder is such that the total weight of the binder in a fibrous material comprises about 30% by weight or less, more preferably about 20% by weight or less, still more preferably about 10% by weight or less, still more preferably 7% by weight or less, still more preferably about 6% by weight or less and most preferably about 5% by weight or less of the fibrous material, based on the weight of the fibers/tapes plus the weight of the binder. In more preferred embodiments, the binder comprises from about 2% to about 30% by weight, more preferably from about 2% to about 20%, still more preferably from about 2% to about 20%, still more preferably from about 2% to about 20%, and most preferably from about 2% to about 10% by weight of the fibers/tapes plus the weight of the binder.

Suitable polymeric binder materials include both low tensile modulus, elastomeric materials and high tensile modulus materials. As used herein throughout, the term tensile modulus means the modulus of elasticity, which for polymeric binder materials is measured by ASTM D638. For the purposes of this disclosure, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. Preferred low modulus elastomeric materials also have a preferred elongation to break of at least about 50%, more preferably at least about 100% and most preferably at least about 300%. Whether a low modulus material or a high modulus material, the polymeric binder may also include fillers such as carbon black or silica, may be extended with oils, or may be vulcanized by sulfur, peroxide, metal oxide or radiation cure systems as is well known in the art.

A wide variety of low modulus polymers and formulations may be utilized as a binder sol long as that they are capable of being applied in particulate form in accordance with this disclosure. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, polyolefins (preferably thermoplastic polyolefins) including polyethylene and copolymers of ethylene, polyamides (useful with some fiber/tape types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2-10) or radial configuration copolymers of the type $R-(BA)_x$ (x=3-150); wherein A is a block from a polyvinyl aromatic monomer and B is a block from a conjugated diene elastomer. Many of these polymers are produced commercially by Kraton Polymers of Houston, Tex. and described in the bulletin "Kraton Thermoplastic Rubber", SC-68-81. Also useful are resin dispersions of styrene-isoprene-styrene (SIS) block copolymer sold under the trademark PRINLIN® and commercially available from Henkel Technologies, based in Dusseldorf, Germany. Conventional low modulus polymeric binder polymers employed in ballistic resistant composites include polystyrene-polyisoprene-polystyrene block copolymers sold under the trademark KRATON® commercially produced by Kraton Polymers.

Suitable particulate polyethylenes non-exclusively include VLDPE (Very Low Density Polyethylene), LDPE (Low Density Polyethylene), LLDPE (Linear Low Density Polyethylene), MDPE (Medium Density Polyethylene), HDPE (High Density Polyethylene), poly(methylene), m-LDPE (metallocene-LDPE), m-LLDPE (metallocene-LLDPE), m-MDPE (metallocene-Medium Density Polyethylene) and COCs (Cyclic Olefin Copolymers). Such polyethylenes are commercially available, such as from Goodfellow Corporation of Coraopolis, Pa. or Resinex of Buckinghamshire, United Kingdom. Useful ethylene copolymers non-exclusively include ethylene vinyl acetate (EVA), ethylene acrylic acid (EAA) and others preferably having high ethylene content.

Suitable particulate nylons non-exclusively include homopolymers or copolymers selected from aliphatic polyamides and aliphatic/aromatic polyamides having a molecular weight of from about 5,000 to about 200,000. General procedures useful for the preparation of polyamides are well known to the art. Such include the reaction products of diacids with diamines. Useful diacids for making polyamides include dicarboxylic acids which are represented by the general formula

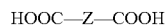

HOOC—Z—COOH wherein Z is representative of a divalent aliphatic radical containing at least 2 carbon atoms, such as adipic acid, sebacic acid, octadecanedioic acid, pimelic acid, suberic acid, azelaic acid, dodecanedioic acid, and glutaric acid. The dicarboxylic acids may be aliphatic acids, or aromatic acids such as isophthalic acid and terephthalic acid. Suitable diamines for making polyamides include those having the formula

$H_2N(CH_2)_nNH_2$ wherein n has an integer value of 1-16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4 trimethylpentamethylenediamine, as well as cycloaliphatic diamines, such as diaminodicyclohexylmethane, and other compounds. Other useful diamines include heptamethylenediamine, nonamethylenediamine, and the like.

Useful polyamide homopolymers include poly(4-aminobutyric acid) (nylon 4), poly(6-aminohexanoic acid) (nylon 6, also known as poly(caprolactam)), poly(7-aminoheptanoic acid) (nylon 7), poly(8-aminooctanoic acid)(nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12), while useful copolymers include nylon 4,6, poly(hexamethylene adipamide) (nylon 6,6), poly(hexamethylene sebacamide) (nylon 6,10), poly(heptamethylene pimelamide) (nylon 7,7), poly(octamethylene suberamide) (nylon 8,8), poly(hexamethylene azelamide) (nylon 6,9), poly(nonamethylene azelamide) (nylon 9,9), poly(decamethylene azelamide) (nylon 10,9), poly(tetramethylenediamine-co-oxalic acid) (nylon 4,2), the polyamide of n-dodecanedioic acid and hexamethylenediamine (nylon 6,12), the polyamide of dodecamethylenediamine and n-dodecanedioic acid (nylon 12,12) and the like. Other useful aliphatic polyamide copolymers include caprolactam/hexamethylene adipamide copolymer (nylon 6,6/6), hexamethylene adipamide/caprolactam copolymer (nylon 6/6,6), trimethylene adipamide/hexamethylene azelaiamide copolymer (nylon trimethyl 6,2/6,2), hexamethylene adipamide-hexamethylene-azelaiamide caprolactam copolymer (nylon 6,6/6,9/6) and the like. Also included are other nylons which are not particularly delineated here.

Of these polyamides, preferred polyamides include nylon 6, nylon 6,6, nylon 6/6,6 as well as mixtures of the same. Of these, nylon 6 is most preferred.

Aliphatic polyamides used in the practice of this invention may be obtained from commercial sources or prepared in accordance with known preparatory techniques. For example, poly(caprolactam) can be obtained from Honeywell International Inc., Morristown, N.J. under the trademark CAPRON®.

Exemplary of aliphatic/aromatic polyamides include poly(tetramethylenediamine-co-isophthalic acid) (nylon 4,1), polyhexamethylene isophthalamide (nylon 6,1), hexamethylene adipamide/hexamethylene-isophthalamide (nylon 6,6/61), hexamethylene adipamide/hexamethyleneterephthalamide (nylon 6,6/6 T), poly (2,2,2-trimethyl hexamethylene terephthalamide), poly(m-xylylene adipamide) (MXD6), poly(p-xylylene adipamide), poly(hexamethylene terephthalamide), poly(dodecamethylene terephthalamide), polyamide 6 T/61, polyamide 6/MXDT/I, polyamide MXDI, and the like. Blends of two or more aliphatic/aromatic polyamides can also be used. Aliphatic/aromatic polyamides can be prepared by known preparative techniques or can be obtained from commercial sources. Other suitable polyamides are described in U.S. Pat. Nos. 4,826,955 and 5,541,267, which are incorporated herein by reference.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. However, low modulus binder materials are preferred over high modulus binder materials. Also useful are the binder materials described in U.S. Pat. No. 6,642,159, the disclosure of which is incorporated herein by reference. However, any resin that is available or sold in the form of a solution, emulsion or dispersion must necessarily be separated from its solvent or liquid carrier prior to deposition onto the fibers/tapes.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Such includes polyester-based polyurethanes and polyether-based polyurethanes, including aliphatic polyester-based polyurethanes and aliphatic polyether-based polyurethanes. The most preferred polyurethanes are those having a modulus at 100% elongation of about 700 psi or more, with a particularly preferred range of 700 psi to about 3000 psi. More preferred are aliphatic polyurethanes having a modulus at 100% elongation of about 1000 psi or more, and still more preferably about 1100 psi or more. Most preferred is an aliphatic, polyether-based polyurethane having a modulus of 1000 psi or more, preferably 1100 psi or more.

In an embodiment where the binder comprises a blend of any of the above materials, it is preferred that the blend comprises two different binders having different melting points. In this embodiment, the binder-coated fibrous plies may be heated/laminated at a temperature above the melting point of a first binder such that all of that first binder is softened and/or partially melted, but below the melting point of the second binder, such that none of the second binder is softened or partially melted. For example, the particulate binder blend may comprise a blend of a low modulus binder and a high modulus binder having differing melting points. Such may include polymers that are chemically different (e.g., a blend of a polyester and an acrylic polymer) or chemically the same (e.g., a blend of a low modulus polyurethane and a high modulus polyurethane), as would be determined by one skilled in the art.

In the process of the disclosure, prior to coating with the particulate binder, the fibers/tapes are first pre-arranged into a continuous web of the desired fibrous structure (i.e., non-woven unidirectional, non-woven felt, woven or knitted) according to conventional fabrication methods. For example, in a typical method of forming a non-woven unidirectional fibrous ply, a plurality of continuous fibers/tapes are formed into a fiber/tape web comprising fibers/tapes aligned in a substantially parallel, unidirectional array of side-by-side fibers/tapes. As described above, when the fibrous ply is formed from multi-filament fibers rather than tapes, this is typically accomplished by supplying fiber bundles from a creel and leading the bundles through guides and one or more spreader bars into a collimating comb. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other. When tapes are utilized rather than fiber bundles, the tapes are arranged in a side-by-side array, preferably edge-to-edge without adjacent tapes overlapping each other, directly from a creel without the need to spread filaments using spreader bars or a collimating comb.

After the tapes are arranged into a tape-based web (side-by-side array of tapes), or after the fibers are spread to form a fiber-based web (or after one of the alternative fibrous web structures are formed by weaving, knitting or felting) the particulate binder is then applied to the fibrous web according to the preferred application method. Thereafter, the coated web is then transferred to a flat-bed laminator where the web is heated and pressed at a temperature above the melting point of the binder polymer, followed by prompt cooling in a cooling section of the flat-bed laminator. This continuous lamination step effectively softens and/or partially melts a portion of the polymer particles, whereby those particles become sticky and bond to the fiber/tape surfaces, while another portion of the polymer particles remain in unsoftened and/or unmelted dry particulate form and remain unbonded to the fiber/tape surfaces. The prompt cooling of the web also ensures that there is no continued softening or partial melting of the binder after this initial pressing.

Figure 10:
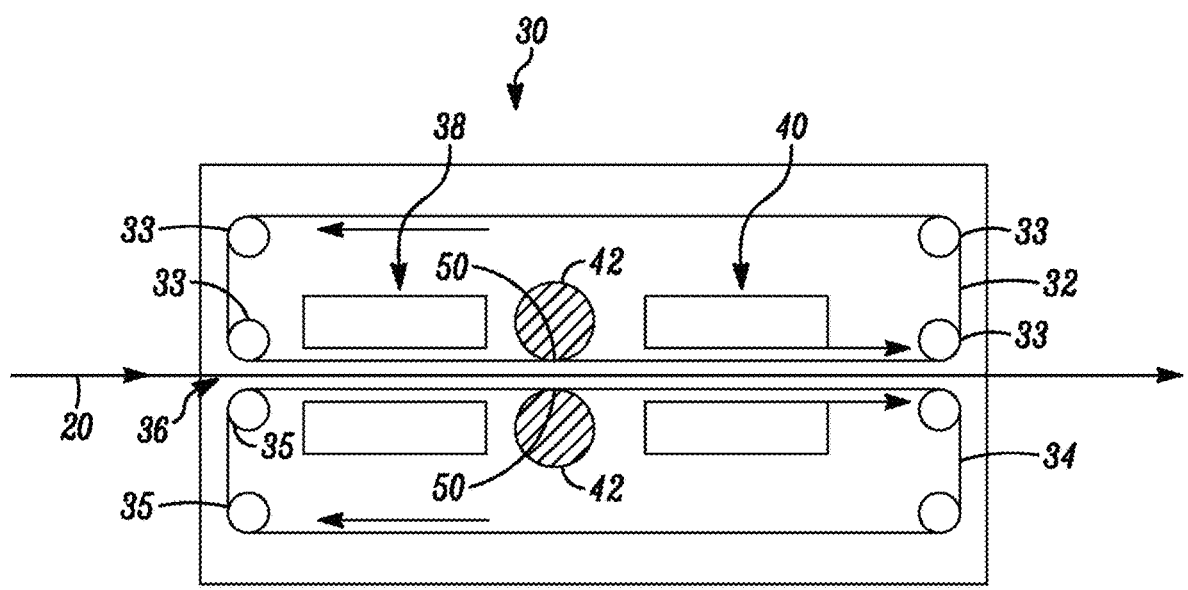
FIG. 10 is a schematic representation of a flat-bed laminator.

In the preferred embodiments, the flat-bed laminator is a dual belt flat-bed laminator, such as the apparatus illustrated in FIG. 10. This preferred flat-bed laminator is described in greater detail in commonly-owned U.S. patent application Ser. No. 15/060,862, which is incorporated by reference herein to the extent consistent herewith. As shown in FIG. 10, a binder coated fibrous web 20 is transported through a flat-bed laminator 30 which includes a first or upper belt 32 that is rotatable about a plurality of rollers 33, and a second or lower belt 34 that is rotatable about a plurality of rollers 35. First and second belts 32, 34 may be coated with a non-stick coating, for example a fluoropolymer-based material such as TEFLON®, commercially available from E. I. du Pont de Nemours and Company of Wilmington, Del. First and second belts 32, 34 are spaced apart from each other by a passageway 36 for fibrous web 20 to pass through. As shown in FIG. 10, illustrative first belt 32 rotates in a counter-clockwise direction and second belt 34 rotates in a clockwise direction which advances fibrous web 20 through flat-bed laminator 30. In one embodiment, first and second belts 32, 34 rotate at a speed of 1-25 meters/second, and preferably 3 meters/second to about 15 meters/second. Illustratively, first and second belts 32, 34 have approximately the same length such that fibrous web 20 is in contact with both first and second belt 32, 34 for approximately the same length of time.

Flat-bed laminator 30 of FIG. 10 further includes a heating portion or zone 38, a cooling portion or zone 40, and a plurality of nip or pressure rollers 42 positioned between heating portion 38 and cooling portion 40. As fibrous web 20 advances within flat-bed laminator 30, fibrous web 20 is heated in heating portion 38. For example, heating portion 38 may be configured for operation at temperatures of as little as 50° C., 60° C., 70° C., 80° C., or as great as 90° C., 100° C., 110° C., 120° C., 130° C., 140° C., 150° C., or any range delimited by any pair of the foregoing values. The temperature of heating portion 38 is to be set within the melting temperature range of the particulate binder such that a portion of the binder softens and/or partially melts in heating portion 38. In the most preferred embodiments, heating portion 38 is set to and operates at a temperature of from about 100° C. to about 140° C., and wherein the selected binders have melting points within said range. In order to ensure that the particulate binder is not completely melted, the fibrous web 20 is heated for as little as about 0.01 second, about 0.05 second, about 0.25 second, about 0.4 second, about 0.50 second, about 1.0 second, about 1.5 seconds, about 2.0 seconds, about 2.5 seconds, about 3.0 seconds, about 4.0 seconds, about 5.0 seconds, about 30 seconds, about 40 seconds, or as much as about 1 minute, about 2 minutes, about 3 minutes, about 4 minutes, or about 5 minutes, or any range delimited by any pair of the foregoing values, as determined by one skilled in the art depending on factors including the melting point of the selected binder and the temperature of the heating portion 38.

As fibrous web 20 leaves heating portion 38, pressure is applied to fibrous web 20 through pressure rollers 42 while a portion of the particles is partially softened and/or partially melted. Pressure rollers may be comprised of various materials, such as metals (e.g., steel), polymers (e.g., elastic rubber), and/or ceramics. Additionally, one of pressure rollers 42 may have a fixed position and the other of pressure rollers 42 may be movable when a force is applied thereto, such that when a force is applied to one of pressure rollers 42, a force also is applied to fibrous web 20. More particularly, pressure rollers 42 may apply a pressure of less than one bar to fibrous web 20. For example, pressure rollers 42 may apply a nip pressure to fibrous web 20 of 10 psi, 30 psi, 50 psi, 70 psi, 90 psi, 110 psi, 130 psi, 150 psi, 170 psi, 190 psi, 210 psi, 230 psi, 250 psi, 270 psi, 290 psi, 310 psi, or within any range delimited by any pair of the foregoing values. In one embodiment, pressure rollers may apply a pressure of 14 psi to fibrous web 20. In the flat-bed laminator 30 as illustrated in FIG. 10, the greatest pressure applied to fibrous web 20 occurs at a tangent 50 of pressure rollers 42 which is parallel to first and second belts 32, 34. Different designs of flat-bed laminator 30 may apply different pressures to fibrous web 20.

Pressure from pressure rollers 42 is applied to fibrous web 20 for about 0.02 seconds to about 5 seconds. More particularly, pressure may be applied to fibrous web 20 for a duration of time of as little as about 0.01 second, about 0.045 second, about 0.4 second, about 0.50 second, about 1.0 second, about 1.5 seconds, about 2.0 seconds, about 2.5 seconds, or as great as about 3.0 seconds, about 3.5 seconds, about 4.0 seconds, about 4.5 seconds, about 5.0 seconds, or within any range delimited by any pair of the foregoing values. In one embodiment, pressure may be applied to fibrous web 20 for a time duration of from about 0.045 to about 0.4 second. Additionally, because pressure rollers 42 have circular cross-sections, the aforementioned times signify the total time duration that fibrous web 20 experiences pressure.

After pressure is applied to fibrous web 20 with rollers 42, fibrous web 20 moves through cooling portion 40 and then exits flat-bed laminator 30. In one embodiment, cooling portion 40 is configured for temperatures less than the melting temperature of the binder polymer. For example, cooling portion 40 may be configured for operation at temperatures of 0° C., 5° C., 10° C., 15° C., 20° C., 25° C., 30° C., 35° C., 40° C., 45° C., 50° C., 60° C., 70° C., 80° C., 90° C. or within any range delimited by any pair of the foregoing values, depending on the particular binder polymer. Because the length of cooling portion 40 is approximately the same as the length of heating portion 38, fibrous web 20 may be cooled for approximately the same amount of time it is heated. More particularly, fibrous web 20 may be cooled for as little as about 0.01 second, about 0.05 second, about 0.25 second, about 0.4 second, about 0.50 second, about 1.0 second, about 1.5 seconds, about 2.0 seconds, about 2.5 seconds, about 3.0 seconds, about 4.0 seconds, about 5.0 seconds, about 30 seconds, about 40 seconds, or as much as about 1 minute, about 2 minutes, about 3 minutes, about 4 minutes, or about 5 minutes, or any range delimited by any pair of the foregoing values. In an alternative embodiment, cooling portion 40 may be eliminated from flat-bed laminator 30 and the binder/composite will cool naturally to a temperature below the melting point of the binder.

As the fibrous web 20 passes through passageway 36, first and second belts 32, 34 may apply a low pressure to fibrous web 20 (i.e., a pressure that is less than the pressure applied by rollers 42). Alternatively, belts 32, 34 may not apply any pressure to fibrous web 20 when passing through chamber 36. In one example, first and second belts 32, 34 may apply a pressure to fibrous web 20 of as little as about 0.01 psi, about 0.05 psi, about 0.10 psi, about 0.15 psi, about 0.20 psi, or about 0.25 psi, or as great as about 1.0 psi, about 2.0 psi, about 3.0 psi, about 4.0 psi, about 5.0 psi, about 6.0 psi, about 7.0 psi, about 8.0 psi, about 9.0, psi or about 10.0 psi, or within any range delimited by any pair of the foregoing values, as fibrous web 20 passes through heating portion 38 and cooling portion 40. In one embodiment, the pressure applied by first and second belts 32, 34 is less than about 0.5 psi. More particularly, the pressure applied by first and second belts 32, 34 is applied for a time duration which is inversely proportional to the belt speed of flat-bed laminator 30. In one embodiment, the residence time that pressure is applied to fibrous web 20 by first and second belts 32, 34 ranges from as little as about 1 second, about 3 seconds, about 5 seconds, about 7 seconds, about 9 seconds, or about 11 seconds, or as much as about 1 minute, about 2 minutes, about 3 minutes, about 4 minutes, or about 5 minutes, or any range delimited by any pair of the foregoing values. As such, fibrous web 20 may experience two distinct pressures—a first low pressure applied by first and second belts 32, 34 when passing through heating and/or cooling portions 38, 40, and a second higher pressure applied by pressure rollers 42.

While this particular flat-bed laminator 30 described above and the aforementioned lamination conditions are most preferred, the unique materials of this disclosure may be fabricated using other flat-bed laminators or modified versions of flat-bed laminator 30, and the use of this specific flat-bed laminator illustrated in FIG. 10 is not intended to be strictly limiting.

Figure 2:
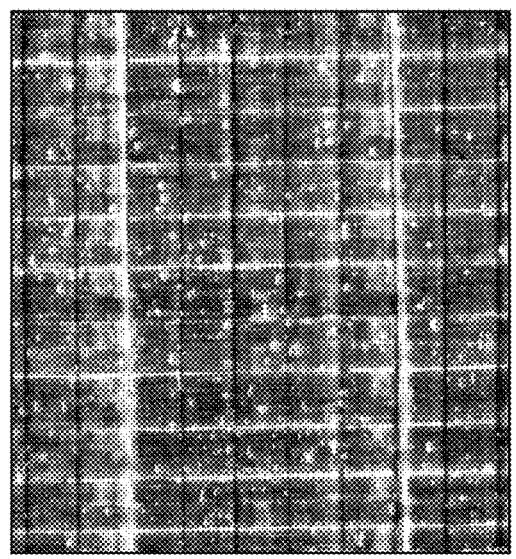
FIG. 2 is a magnified top-view of a portion of FIG. 1, magnified at 1.8×.
Figure 3:
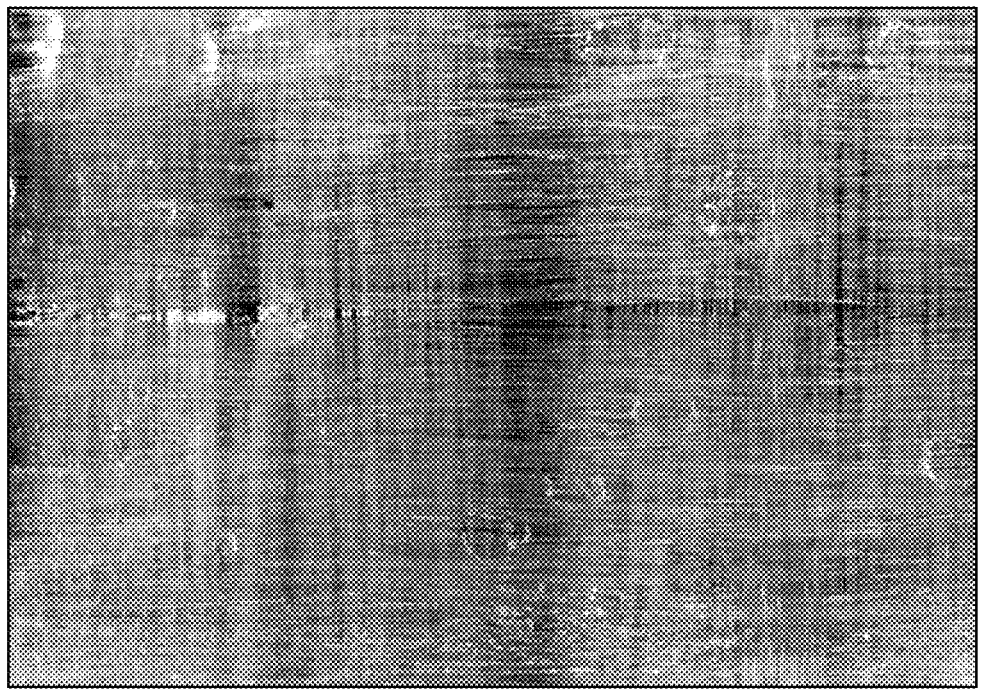
FIG. 3 is a top-view stereomicroscope image, magnified at 20×, of the fabric of FIG. 1.
Figure 4:
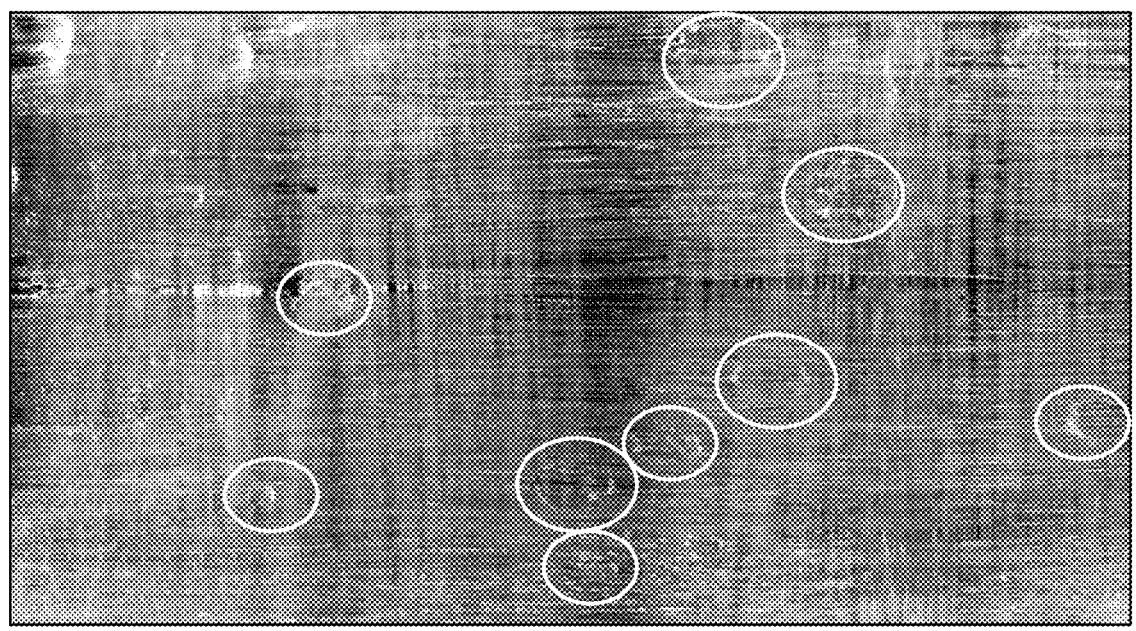
FIG. 4 is a duplicate of the top-view stereomicroscope image of FIG. 3 having the resin patches circled.
Figure 5A:
FIG. 5A is a top-view scanning electron microscope (SEM) photograph (at an order of magnitude of ×70) of a resin patch in the fabric of FIG. 1.
Figure 5B:
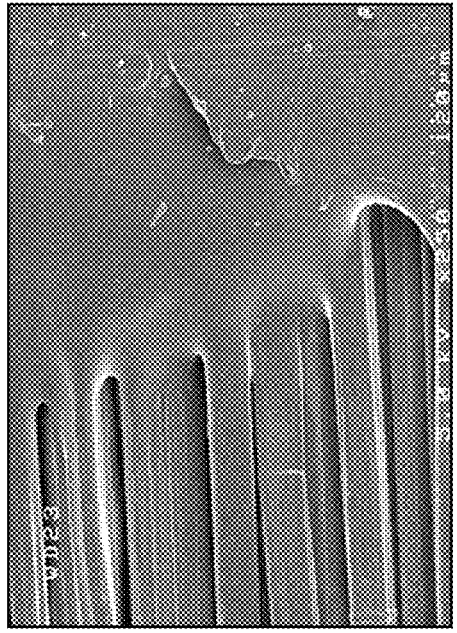
FIG. 5B is a top-view SEM photograph (at an order of magnitude of ×250) of the portion of the resin patch illustrated in FIG. 5A that is identified by a white box.
Figure 6A:
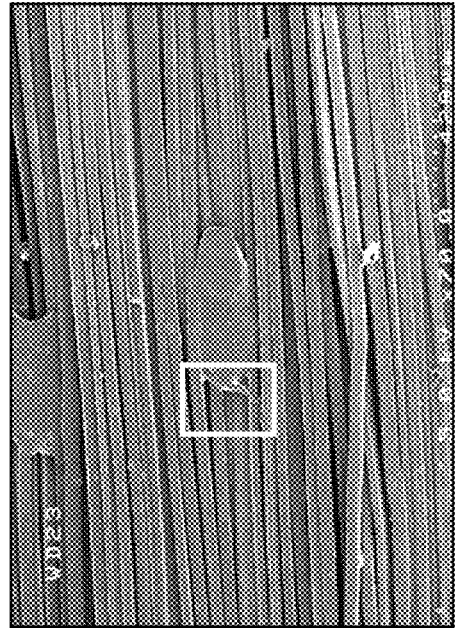
FIG. 6A is a top-view SEM photograph (at an order of magnitude of ×70) of a resin patch in the fabric of FIG. 1.
Figure 6B:
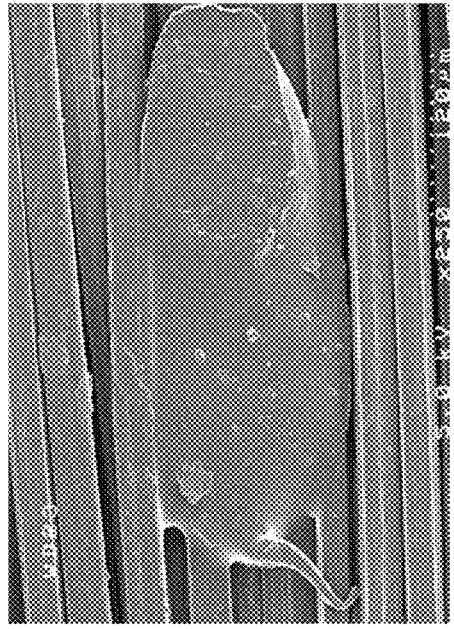
FIG. 6B is a top-view SEM photograph (at an order of magnitude of ×250) of the portion of the resin patch illustrated in FIG. 6A that is identified by a white box.
Figure 7A:
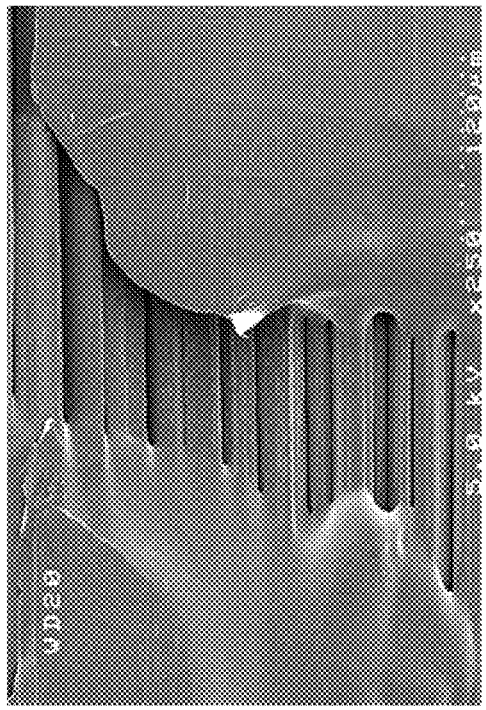
FIG. 7A is a top-view SEM photograph (at an order of magnitude of ×70) of a resin patch in the fabric of FIG. 1.
Figure 7B:
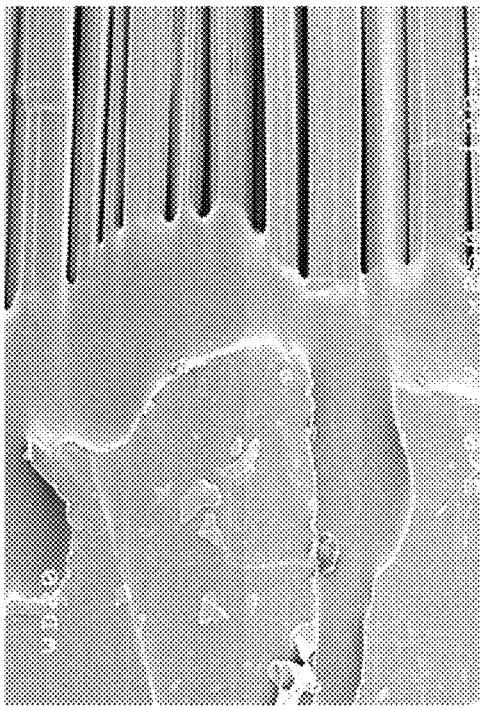
FIG. 7B is a top-view SEM photograph (at an order of magnitude of ×250) of the portion of the resin patch illustrated in FIG. 7A that is identified by a white box.
Figure 8A:
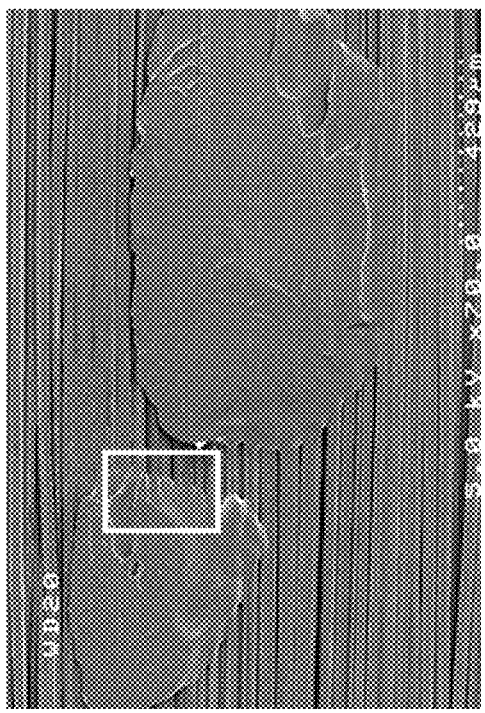
FIG. 8A is a top-view SEM photograph (at an order of magnitude of ×70) of a resin patch in the fabric of FIG. 1.
Figure 8B:
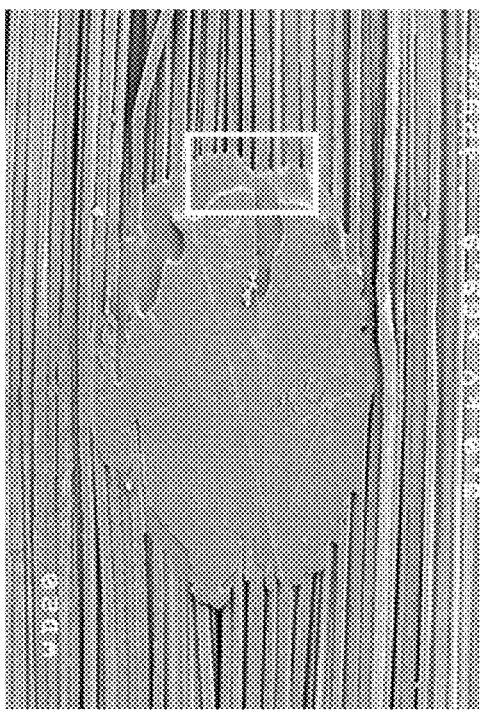
FIG. 8B is a top-view SEM photograph (at an order of magnitude of ×250) of the portion of the resin patch illustrated in FIG. 8A that is identified by a white box.
Figure 9:
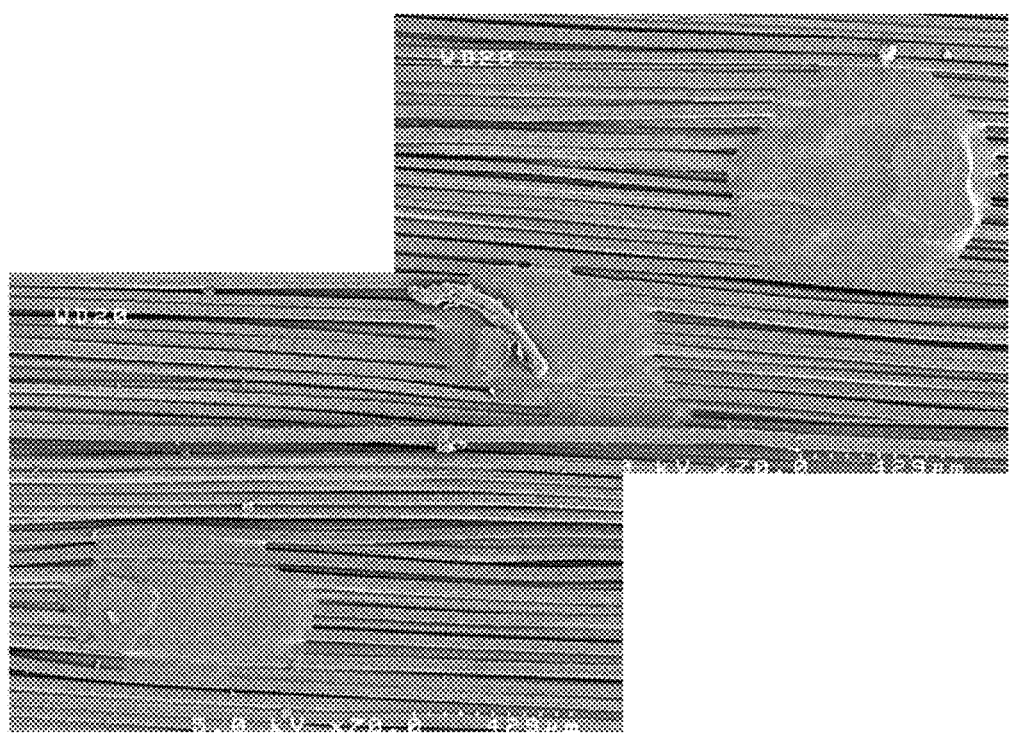
FIG. 9 is a top-view SEM photograph (at an order of magnitude of ×70) of three resin patches in the fabric of FIG. 1, also illustrating the presence of binder particles.

In the areas where the polymer particles are softened and/or partially melted, the pressure exerted on the fibrous web by pressure rollers 42 (or an alternative press in an alternative apparatus) will partially flatten the particles into the above-referenced discontinuous patches. These patches are not fully flattened but rather remain as raised bumps extending from the fiber/tape surfaces. Because the polymer forming the patches is not heated enough to cause it to flow, the partially flattened patches will accordingly have a limited aspect ratio (i.e., the ratio of the length to width of the patches). In preferred embodiments, the aspect ratio of the patches is preferably less than 10:1, more preferably from about 1:1 to about 10:1, more preferably less than about 3:1, and most preferably from about 1:1 to about 3:1. Such patches are most clearly illustrated in FIGS. 5A, 5B, 6A, 6B, 7A, 7B, 8A, 8B and 9, which are magnified SEM images showing close up views of the raised extending from the fiber/tape surfaces. Each of the imaged patches in these magnified images was a portion of the fibrous composite shown in FIGS. 1, 3 and 4. FIG. 2 is a magnified sectional view of the bottom right corner of the composite image of FIG. 1. FIG. 4 is a duplicate of FIG. 3 but with 9 localized patches marked for clarity.

As illustrated in FIGS. 5A, 5B, 6A, 6B, 7A, 7B, 8A, 8B and 9, these patches of binder bond portions of adjacent fibers (or adjacent tapes, not illustrated) to each other, enhancing the structural stability of the fibrous ply. Also of importance, in the areas where the binder remains in dry particulate form and unbonded to the fiber/tape surfaces, other portions of such adjacent fibers/tapes within the ply will remain unattached to each other. The presence of such unbonded, dry particles is seen most clearly in FIGS. 2, 6A and 9. Unexpectedly, the presence of such dry particles combined with the discontinuous patches has been found to enhance the buoyancy of the fibrous material by maintaining the fibrous plies as partially open structures wherein empty spaces are maintained within the plies, as shown most clearly in FIGS. 3, 4, 5A and 9. In the final product, the remaining particles preferably have an average particle size (diameter) of from about 50 µm to about 700 µm, more preferably from about 80 µm to about 600 µm, still more preferably from about 80 µm to about 500 µm, still more preferably from about 80 µm to about 400 µm, still more preferably from about 80 µm to about 300 µm, still more preferably from about 80 µm to about 200 µm and most preferably from about 100 µm to about 200 µm. Preferably, at least about 90% of the particles have a particle size (diameter) that is within 40 µm of the average particle size.

As discussed above, after the particle coated fiber/tape web is processed through the flat-bed laminator, the web is then cut to a desired length to form a plurality of fibrous plies of the desired lengths, and thereafter a desired number of plies are stacked on each other surface-to-surface in a substantially coextensive fashion and consolidated into a unitary composite. With particular regard to fibrous materials comprising a plurality of unidirectional non-woven fibrous plies, it is conventionally known in the art to coextensively stack individual fibrous plies upon each other such that the unidirectionally oriented fibers/tapes in each fibrous ply are oriented in a non-parallel longitudinal fiber/tape direction relative to the longitudinal fiber/tape direction of each adjacent ply. Most typically, the fibrous plies are cross-plied orthogonally at 0° and 90° angles wherein the angle of the fibers/tapes in even numbered layers is preferably substantially the same and the angle of the fibers/tapes in odd numbered layers is preferably substantially the same, but adjacent plies can be aligned at virtually any angle between about 0° and about 90° with respect to the longitudinal fiber/tape direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent compatible herewith. With particular regard to fibrous materials comprising one or more woven fibrous plies, it is also typical for the warp and weft component fibers/tapes forming a single fibrous material to be oriented orthogonally to each other.

Merging of the multiple plies into unitary composite structures may be accomplished using conventional techniques in the art, including both low pressure consolidation techniques and high pressure molding techniques, with or without heat. Methods of consolidating fibrous plies/layers are well known, such as by the methods described in U.S. Pat. No. 6,642,159. In the preferred embodiments, consolidation is preferably conducted under mild conditions, i.e., at temperatures ranging from about 50° C. to about 175° C., more preferably from about 95° C. to about 175° C. and most preferably from about 105° C. to about 175° C., and at pressures ranging from about 5 psig (0.034 MPa) to about 2500 psig (17 MPa), more preferably from about 5 psig to about 100 psi (0.69 MPa), with a duration of from about 0.01 seconds to about 24 hours, more preferably from about 0.02 seconds to about 2 hours, still more preferably from about 5 seconds to about 2 hours and most preferably from about 30 seconds to about 1 hour. Consolidation may be conducted, for example, by passing the stack through a calender nip set, by pressing in a flat-bed laminator (such as that described above and illustrated in FIG. 10), a double belt or steel belt press or in an autoclave. Consolidation may also be conducted by vacuum molding the material in a mold that is placed under a vacuum. Vacuum molding technology is well known in the art. Most commonly, consolidation is conducted using a flat-bed laminator.

Alternatively, the stack of plies may be merged together using high pressure merging in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. However, in order to ensure that the unsoftened and/or unmelted portion of the particulate binder does not melt during a high pressure molding step, molding should be conducted at relatively low temperatures. In this regard, preferred molding temperatures range from about 200° F. (~93° C.) to about 350° F. (~177° C.), more preferably at a temperature from about 200° F. to about 300° F. (~149° C.) and most preferably at a temperature from about 200° F. to about 280° F. (~138° C.).

While each of the molding and consolidation techniques described herein are similar and the terms are often used interchangeably in the art, "molding" as used herein specifically refers to a method of merging by bonding fibrous plies/layers together in a batch process, while "consolidation" refers to a method of merging by bonding fibrous plies/layers together in a generally continuous process. However, this is not intended to be strictly limiting. Also, in either process, suitable temperatures, pressures and times are generally dependent on the type of polymeric binder coating materials, polymeric binder content, process used and fiber/tape type.

As discussed above, as a result of the dry coating process described herein, the resulting materials have binder-free areas where portions of fiber/tape surfaces are not coated with the binder, neither in patch form nor in particle form. In general, only one surface of each fibrous layer will be coated with the particulate binder, and accordingly about 50% or less of the fiber/tape surface area of each individual fibrous ply will be coated with the particulate binder. It is noted that the process of passing the fibrous web through the flat-bed laminator and consolidation of the multi-ply stack of fibrous plies, which causes flattening of a portion of the binder particles, will thereby slightly increase the surface area coverage. Nevertheless, even after these processing steps, it is preferred that less than 50% of the surface area is covered by the binder, preferably less than about 40%, preferably less than about 30%, preferably less than about 20%, more preferably from about 2% to about 20%, still more preferably from about 5% to about 15%, and most preferably from about 5% to about 10% of the surface area of the fibers/tapes in each fibrous ply.

By virtue of utilizing a particulate powder rather than a liquid binder or molten binder, fibrous plies of this disclosure may be fabricated having extremely low areal densities while maintaining effective levels of ballistic resistance. In preferred embodiments, each fibrous ply of the disclosure has a preferred total areal density (i.e. the fiber areal density (FAD) plus the binder areal density) of about 125 g/m$^2$ or less, more preferably about 100 g/m$^2$ or less, still more preferably about 95 g/m$^2$ or less, still more preferably about 90 g/m$^2$ or less, still more preferably about 85 g/m$^2$ or less, still more preferably about 80 g/m$^2$ or less, still more preferably about 75 g/m$^2$ or less, and most preferably about 70 g/m$^2$ or less, with most preferred areal density ranges of from about 20 g/m$^2$ to about 80 g/m$^2$ or from about 30 g/m$^2$ to about 80 g/m$^2$. For the purposes of this disclosure, the FAD is the same for fiber-based and multifilament tape-based plies/composites because the multifilament tapes are simply flattened and compressed versions of the same fibers.

In embodiments where the total areal density per fibrous ply is extremely low, i.e. where the individual ply total areal density is less than 100 g/m$^2$, these low values are typically obtained where the fibrous plies are in the form of unidirectional non-woven fibrous plies that have been subjected to extensive fiber spreading or extensive flattening/compression during tape formation. In these embodiments, the FAD levels are also exceedingly low, i.e., about 80 g/m$^2$ or less, more preferably about 70 g/m$^2$ or less, still more preferably about 60 g/m$^2$ or less, still more preferably about 50 g/m$^2$ or less and most preferably about 40 g/m$^2$ or less, with most preferred fiber areal density ranging from about 15 g/m$^2$ to about 80 g/m$^2$ or from about 30 g/m$^2$ to about 60 g/m$^2$. Preferred binder coating weights range from about 1 g/m$^2$ to about 20 g/m$^2$, more preferably from about 2 g/m$^2$ to about 15 g/m$^2$, and most preferably from about 3 g/m$^2$ to about 10 g/m$^2$. However, at such exceedingly low FAD values, the fibrous plies can have low stability and very difficult to handle, making them very difficult to process through the flat-bed laminator or difficult to consolidate. Accordingly, when ply stability is a concern, the stability may be improved by applying one or more thin thermoplastic overlays onto a surface of the fibrous web. The thermoplastic overlay may be, for example, a discontinuous thermoplastic web, an ordered discontinuous thermoplastic net, a non-woven discontinuous adhesive fabric, a non-woven discontinuous adhesive scrim, a porous film or a plurality of thin thermoplastic polymer strips. Suitable polymers for the thermoplastic overlay non-exclusively include thermoplastic polymers non-exclusively may be selected from the group consisting of polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Also useful are natural and synthetic rubber polymers. Of these, polyolefin and polyamide layers are preferred. The preferred polyolefin is a polyethylene. Non-limiting examples of useful polyethylenes are low density polyethylene (LDPE), linear low density polyethylene (LLDPE), Medium Density Polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Of these, the most preferred polyethylene is MDPE.

In a preferred embodiment, the thermoplastic overlay is a heat-activated, non-woven, adhesive web, such as SPUNFAB®, commercially available from Spunfab, Ltd, of Cuyahoga Falls, Ohio (trademark registered to Keuchel Associates, Inc.). Also suitable are THERMOPLAST™ and HELIOPLAST™ webs, nets and films, commercially available from Protechnic S.A. of Cernay, France. Of all the above, most preferred is a polyamide web, particularly SPUNFAB® polyamide webs. SPUNFAB® polyamide webs have a melting point of typically from about 75° C. to about 200° C., but this is not limiting.

When the thermoplastic overlay is a scrim such as a SPUNFAB® web, the overlay is preferably very thin, having a preferred layer thickness of from about 1 μm to about 250 μm, more preferably from about 5 μm to about 25 μm and most preferably from about 5 μm to about 9 μm. While such thicknesses are preferred, it is to be understood that other thicknesses may be produced to satisfy a particular need and yet fall within the scope of the present disclosure. It should also be understood that these thicknesses are not necessarily descriptive of continuous webs. For example, SPUNFAB® webs are several mils thick where material is present, but most of the web is just air. These materials are better described by their basis weight, e.g. particularly preferred is a SPUNFAB® web having a basis weight of 6 g/m$^2$. The thermoplastic overlay preferably comprises from about 1% to about 25% by weight of the overall composite, more preferably from about 1% to about 17% percent by weight of the overall composite and most preferably from 1% to 12%, based on the weight of the fibers/tapes plus the binder plus the weight of the overlay(s).

In another preferred embodiment, the thermoplastic overlay comprises thin thermoplastic polymer strips in the form of binding elongate bodies. As used herein, a "binding" elongate body is an elongate body such as a fiber that at least partially comprises a heat activated thermoplastic polymer having a melting temperature below a melting temperature of the structural fibers/tapes (e.g., the high tenacity fibers/tapes), and preferably having a melting temperature that is the same as or below that of the polymeric binder. Such binding elongate bodies are conventionally known in the art and non-exclusively include bodies such as fibers comprising ethylene-vinyl acetate, ethylene-acrylate copolymers, styrene block copolymers, polyurethanes, polyamides, polyesters and polyolefins, including and most preferably polyethylene. In this embodiment, only a minimal amount of binding bodies are needed to properly stabilize the fibrous web or fibrous ply, and in most applications it is sufficient to apply binding fibers across the entire width of the fibrous web or ply at one or two inch intervals down the length of the web/ply.

The thermoplastic overlay(s) is (are) preferably bonded to at least one fibrous ply using well known techniques, such as thermal lamination. Typically, lamination is performed by positioning the fibrous ply and overlay(s) on one another coextensively as discussed above and the combination is pressed through the nip of a pair of heated laminating rollers under conditions of sufficient heat and pressure and according to techniques well known in the art to cause the layers to combine into a unitary film. Such lamination heating may be may performed at the same temperatures, pressures, rate and other conditions as discussed above for processing the binder coated fibrous plies through flat-bed laminator 30.

In one embodiment, the thermoplastic overlay(s) may be applied to a single binder-coated fibrous ply followed by bonding the overlay(s) to the single ply by passing the combination through a laminator. In another embodiment, the thermoplastic overlay(s) may serve as an intermediate adhesive layer between two binder-coated fibrous plies wherein a second binder-coated fibrous ply is applied on top of the overlay(s) after the overlay(s) is (are) applied onto the first fibrous ply, followed by passing the combination through the laminator. In one particularly preferred method, a first non-woven fibrous ply is provided that has a dry, solvent-free particulate polymeric binder on at least one surface; at least one thermoplastic overlay is then applied onto a surface of the first non-woven fibrous ply such that the overlay(s) only partially cover the surface ply; the thermoplastic overlay(s) is (are) then optionally heated to at least its softening temperature to allow it to bond to the surface of the first ply; a second non-woven fibrous ply having a dry, solvent-free particulate polymeric binder on at least one surfaces is then applied onto the first non-woven fibrous ply on top of the overlay(s); and then the combination is consolidated under heat and pressure wherein at least a portion of the particulate polymeric binder of the first non-woven fibrous ply and at least a portion of the particulate polymeric binder of the second non-woven fibrous ply are melted, and whereby said binders bond the first and second non-woven fibrous plies together.

Figure 11:
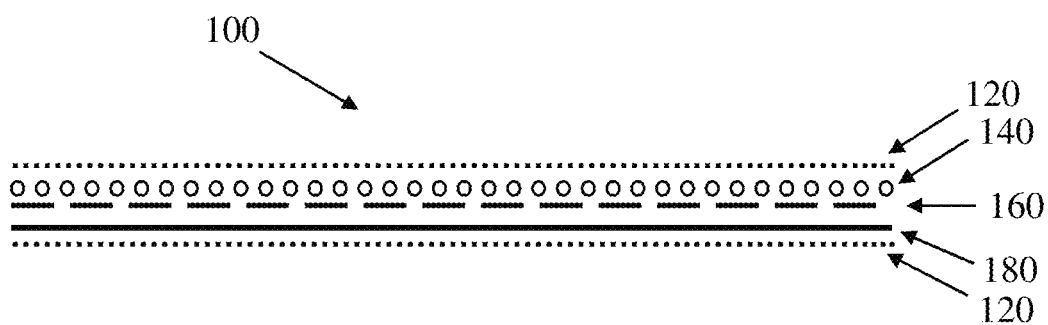
FIG. 11 is a side-view schematic representation of a multilayer ballistic resistant material having two fibrous plies coated with a powder binder and an intermediate scrim.

A multilayer structure 100 formed by this method is schematically represented in FIG. 11, wherein a first unidirectional fibrous ply 140 having fibers oriented at 0° is combined with a thermoplastic scrim 160 and second unidirectional fibrous ply 180 having fibers oriented at 90°. Each of the unidirectional fibrous plies is coated on their outer surfaces with a particulate binder 120 such that the binder and overlay are positioned on opposite surfaces of each fibrous ply. Variations of this method may also be practiced as would be determined by one skilled in the art. For example, the overlay(s) may be applied onto a surface of the fibrous plies prior to applying the binder onto an opposite surface, or two fibrous plies may be joined together with each having a particulate binder and one or more thermoplastic overlays on opposite surfaces prior to adjoining them. In another embodiment, both the particulate binder and the one or more thermoplastic overlays may be applied onto each outer surface of each fibrous ply.

In addition to or alternative to the option of incorporating the thermoplastic overlay(s) between fibrous plies in a multi-ply composite, it may be desired to attach a polymeric film to one or both of the outer surfaces of a multi-ply material. Such is well known in the art of ballistic resistant composites. In these embodiments, particularly preferred polymer films non-exclusively include thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof. Such thermoplastic polymer layers are preferably very thin, having preferred layer thicknesses of from about 1 µm to about 250 µm, more preferably from about 5 µm to about 25 µm and most preferably from about 5 µm to about 9 µm. While such thicknesses are preferred, it is to be understood that other thicknesses may be produced to satisfy a particular need and yet fall within the scope of the present disclosure. Such thermoplastic polymer layers may be bonded to the outer composite surfaces using well known techniques, such as by thermal lamination in a flat-bed laminator under the conditions discussed above, before, during or after merging together the individual fibrous plies into a unitary, consolidated composite. Additionally, or alternatively, one or more surfaces of a fibrous ply or of the unitary, consolidated composite may be coated with protective coating, such as a coating providing water repellent properties. Suitable coatings non-exclusively include natural rubber, polyvinyl chloride, polyurethane, silicone elastomers, fluoropolymers, and waxes, as would be determined by one skilled in the art. Particularly preferred water resistant polymer coatings non-exclusively include fluoropolymer based coatings, such as OLEOPHOBOL™ water repellent agents commercially available from Huntsman LLC of Salt Lake City, Utah, and polyurethane coatings.

The multi-ply composite materials fabricated herein according to the above methods achieve a unique composite structure that retains a substantial volume of empty space within the interior of the composite article. In a typical embodiment, a composite material formed according to the above methods will comprise an empty space volume that is greater than 20% of the total volume of the composite material, preferably from about 20% to about 30% of the total volume of the composite material and articles formed therefrom, and thereby yielding materials having substantially enhanced positive buoyancy in water relative to comparative materials having lower empty space volumes. Importantly, these materials allow the formation of ballistic resistant articles having superior positive buoyancy, such as buoyant plates for use in ballistic resistant vests, without requiring the use of other buoyancy enhancing components, such as foams or air bladders, and thereby fulfilling a longstanding need in the art. These benefits are also extended to many other non-ballistic related industries as well where buoyant fabrics may be desired, including applications such as air bags (e.g. for hovercrafts), sail cloths and other marine fabrics, as well as other applications where light weight is more important than buoyancy, such as air curtains, textile reinforcements for architectural structures, awnings, banners, flags, canopies, tents, parachutes, tarps, backpacks, footwear, etc. The following non-limiting examples serve to illustrate the invention:

EXAMPLE 1

A continuous, non-woven web of parallel SPECTRA® fibers (1300 denier SPECTRA®1000 fibers) is prepared having a width of 38 cm. A dry, low density polyethylene (LDPE) powder was manually sprinkled onto one surface of the web, partially coating the surface such that 20% of the surface area of the one surface is coated with the powder. A plurality of squares are cut from this web having length×width dimensions of 38 cm×38 cm. Two squares (plies) are formed into a stack with the plies arranged in 0°/90° cross-plied orientations relative to the longitudinal axes of their component fibers, and the resin comprises about 10% by weight of the combined 2-ply material. The two-ply material is then passed through a flat-bed laminator wherein they are pressed together for 30 seconds at 100° C. and under contact pressure of about 50 psi whereby they are attached to each other. The LDPE powder is only partially melted, forming some raised, discontinuous patches of the LDPE bonded to and extending from the fiber surfaces and also leaving plurality of polymer particles on and between the fibers. The resulting material has 22% empty space volume and exhibits excellent positive buoyancy.

EXAMPLE 2

Example 1 is repeated but prior to mating the two plies together one or both of the plies is/are stabilized with a thermoplastic overlay bonded to at least one of their surfaces. The thermoplastic overlay is a plurality of binding polymer strips applied laterally across the ply orthogonal to the longitudinal fiber axis. The binding polymer strips are formed from a heat activated polyethylene having a melting point below the melting point of the LDPE powder.

EXAMPLE 3

Example 2 is repeated except the thermoplastic overlay is a heat-activated, non-woven, adhesive SPUNFAB® web, commercially available from Spunfab, Ltd. (SPUNFAB® 408HWG 6-gsm fusible polyolefin resin web). The SPUNFAB® is added to the top side of the bottom ply (its position as it is passed through the flat-bed laminator).

EXAMPLE 4

Example 1 is repeated except the web is formed from high tenacity UHMWPE fibrous tapes having a tenacity of approximately 33 g/denier that were made according to a process described in U.S. Pat. No. 8,236,119. The tapes averaged about 3/16 inch wide and had an aspect ratio of greater than 10:1 and the web is arranged with tape edges contacting each other but without adjacent tapes overlapping each other.

While the present disclosure has been particularly shown and described with reference to preferred embodiments, it will be readily appreciated by those of ordinary skill in the art that various changes and modifications may be made without departing from the spirit and scope of the disclosure. It is intended that the claims be interpreted to cover the disclosed embodiment, those alternatives which have been discussed above and all equivalents thereto.

What is claimed is:

1. A ballistic resistant material comprising at least one fibrous ply, each fibrous ply comprising a plurality of fibers and/or a plurality of tapes, wherein one or more of said fibers/tapes have surfaces that are partially covered by raised, discontinuous patches of a polymeric binder bonded to and extending from the fiber/tape surfaces, and wherein the material further comprises a plurality of polymer particles on and/or between said fibers/tapes, wherein said patches of the polymeric binder and said polymer particles comprise the same polymer and wherein at least some of said polymer particles are unsoftened.

2. The ballistic resistant material of claim 1 wherein the patches have an aspect ratio of less than 10:1 and are formed on the fiber/tape surfaces by softening and/or partially melting a dry, solvent-free polymeric powder.

3. The ballistic resistant material of claim 2 wherein the patches have an aspect ratio of less than 3:1, wherein said patches are flattened powder particles in the form of raised bumps that extend from the fiber/tape surfaces, and wherein the polymer forming the patches has not been heated enough to flow from its original location of application.

4. The ballistic resistant material of claim 1 wherein said unsoftened polymer particles are unmelted.

5. The ballistic resistant material of claim 1 wherein said polymeric binder and said polymer particles comprise the same polymer, wherein each fibrous ply comprises a plurality of adjacent, unidirectional fibers and/or a plurality of adjacent, unidirectional tapes, and wherein said particles are both on and between said fibers/tapes.

6. The ballistic resistant material of claim 1 wherein less than 50% of the surface area of each of said fibers/tapes is covered by said patches.

7. The ballistic resistant material of claim 1 wherein each fibrous ply is non-woven and comprises a plurality of adjacent, unidirectional, parallel fibers/tapes, and wherein from 2% to 20% of the surface area of each of said fibers/tapes is covered by said polymeric binder.

8. The ballistic resistant material of claim 1 wherein each fibrous ply has a fiber areal density of less than 80 g/m$^2$ and a total areal density of less than 100 g/m$^2$.

9. The ballistic resistant material of claim 5 wherein the patches of polymeric binder and the plurality of polymer particles combined comprise about 6 wt. % or less by weight of the ballistic resistant material, and wherein said particles have an average particle size of from about 100 μm to about 200 μm.

10. A multilayer composite comprising a plurality of consolidated plies of the ballistic resistant material of claim 1, wherein said plies have been consolidated under heat and pressure.

11. The multilayer composite of claim 10 wherein said composite has an interior empty space volume of at least 20% of the volume of said composite.

12. A ballistic resistant material comprising:
   a) a plurality of non-woven plies, each ply comprising a plurality of adjacent, unidirectional fibers and/or a plurality of adjacent, unidirectional tapes, wherein one or more of said fibers/tapes have surfaces that are partially covered by discontinuous patches of a polymeric binder bonded to the fiber/tape surfaces; each ply having an outer top surface and an outer bottom surface; and
   b) at least one thermoplastic overlay bonded to at least one surface of at least one of said plies, wherein said at least one thermoplastic overlay only partially covers said at least one surface, and wherein said at least one thermoplastic overlay has a melting point below a melting point of said polymeric binder,
   and wherein the material further comprises a plurality of polymer particles on and between said fibers/tapes, wherein said patches of the polymeric binder and said polymer particles comprise the same polymer and wherein said particles have an average particle size of from about 50 μm to about 700 μm.

13. The ballistic resistant material of claim 12 wherein the thermoplastic overlay comprises a non-woven, discontinuous adhesive web, wherein at least some of said polymer particles are unsoftened and not bonded to the fiber surfaces and wherein said particles have an average particle size of from about 100 μm to about 200 μm.

14. The ballistic resistant material of claim 12 wherein the thermoplastic overlay comprises one or more binding elongate bodies having a melting point below a melting point of said polymeric binder.

15. The ballistic resistant material of claim 12 wherein the non-woven plies are consolidated and wherein said ballistic resistant material has a volume that partially comprises empty space, wherein said empty space comprises greater than 20% of said ballistic resistant material.

16. The ballistic resistant material of claim 15 wherein said material has a fiber areal density of less than about 80 g/m$^2$.

17. The ballistic resistant material of claim 15 wherein said material is buoyant in water.

18. The ballistic resistant material of claim 12 wherein the thermoplastic overlay comprises of non-woven, discontinuous adhesive web; wherein at least some of said polymer particles are unsoftened and not bounded to the fiber surfaces; wherein the patches have an aspect ratio of less than 10:1 and are formed on the fiber/tape surfaces by softening and/or melting a dry, solvent-free polymeric powder, and wherein said unsoftened polymer particles are unmelted and have an average particle size of from about 80 μm to about 500 μm.

19. The ballistic resistant material of claim 12 wherein at least some of said polymer particles are unsoftened, wherein said unsoftened polymer particles are unmelted and are not bonded to the fiber surfaces, wherein said particles are both on and between said fibers/tapes, and wherein said patches are flattened powder particles in the form of raised bumps that extend from the fiber/tape surfaces.

* * * * *